United States Patent [19]

Jones et al.

[11] Patent Number: 4,612,334

[45] Date of Patent: Sep. 16, 1986

[54] POROUS POLYMERS

[75] Inventors: Keith Jones; Barry R. Lothian; Alexander Martin; Graham Taylor; Zia Haq, all of Merseyside, England

[73] Assignee: Lever Brothers Company, New York, N.Y.

[21] Appl. No.: 707,279

[22] Filed: Mar. 1, 1985

[30] Foreign Application Priority Data

Mar. 5, 1984 [GB] United Kingdom ............... 8405680

[51] Int. Cl.⁴ ...................... C08F 14/00; C08F 114/00
[52] U.S. Cl. .................................... 521/146; 521/64; 521/147; 521/149; 521/150
[58] Field of Search ................ 521/64, 146, 147, 149, 521/150

[56] References Cited

U.S. PATENT DOCUMENTS

| Re. 27,444 | 7/1972 | Will | 521/62 |
|---|---|---|---|
| 3,255,127 | 6/1966 | von Bonin et al. | 525/201 |
| 3,256,219 | 6/1966 | Will | 521/62 |
| 3,734,867 | 5/1973 | Will | 521/63 |
| 3,763,056 | 10/1973 | Will | 521/62 |
| 3,988,508 | 10/1976 | Lissant | 526/344.2 |
| 4,039,489 | 8/1977 | Fletcher et al. | 521/63 |
| 4,522,953 | 6/1985 | Barby et al. | 521/64 |
| 4,536,521 | 8/1985 | Haq | 521/64 |

FOREIGN PATENT DOCUMENTS

| 60138 | 9/1982 | European Pat. Off. |
|---|---|---|
| 1078055 | 8/1967 | United Kingdom . |
| 1116800 | 6/1968 | United Kingdom . |
| 1236313 | 6/1971 | United Kingdom . |
| 1458203 | 12/1976 | United Kingdom . |
| 1483587 | 8/1977 | United Kingdom . |
| 1576228 | 10/1980 | United Kingdom . |
| 2000150 | 5/1982 | United Kingdom . |

*Primary Examiner*—Morton Foelak
*Attorney, Agent, or Firm*—Milton L. Honig; James J. Farrell

[57] ABSTRACT

This invention provides a highly porous crosslinked functionalized polymer having interconnected cavities of micron dimensions and having a pore volume greater than about 5.6 cc/g and having a capacity to absorb water and also to absorb saline solutions. The polymers are generally based on styrene or various acrylates or mixtures and have a functional group selected from a large range of ionic and polar compositions.

10 Claims, No Drawings

POROUS POLYMERS

This invention relates to porous polymeric materials; more particularly to crosslinked polymeric materials of high absorbency and to methods for their production and chemical modification from low density polymers. In European Patent Application No. 60 138 novel crosslinked polymers have been disclosed which are of unusually low density and high porosity.

A technique for their preparation employing a novel high internal phase emulsion polymerisation system has been disclosed and various monomers have been employed in the production of these porous polymers.

In view of the interesting properties exhibited by these porous polymers further work has been done on evaluating alternative monomers in an attempt to introduce chemically active groupings into the porous polymer which, together with the polymer structure, allow the preparation of porous polymers having useful physical and chemical characteristics.

More particularly by selection of the appropriate functional groups and drying environment specialised absorbents and carriers can be produced.

The materials provided by this invention comprise a family of closely related highly porous crosslinked functionalised polymers crosslinked from 1-20% and having interconnected cavities or chambers of micron dimensions whose total pore volume is greater than 5.6 cc/gm in its solvent swollen state and having a capacity for spontaneous water absorption from its dry state of at least 3 g liquid per gram of polymer and having a capacity for saline absorption (10% NaCl) such that the ratio of saline to water absorption is greater than 0.1, preferably greater than 0.5 and most preferably greater than 0.7, said polymer comprising structural units

in which A represents a crosslinked carbon chain, Y is an optional spacer group and Z is an ionic or polar functional group, selected from lower alkyl cationic nitrogen species, lower alkyl amine oxide, alkoxylate, a metal or ammonium or substituted salt of a sulphuric, carboxylic, phosphoric or sulphonic acid group or a mixture of such groups, except that where Z is a sulphonic acid Y does not represent

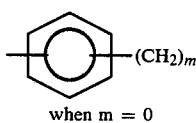

when m = 0

Preferably, A represents a saturated, crosslinked carbon chain having the structure:

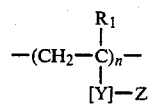

where R is hydrogen or methyl group. Y is an optional spacer group, especially

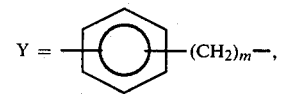

where m=0 to 5 (preferably m=0 or 1).

Z represents a single or mixture of ionic or polar functional groups of structures 1-3

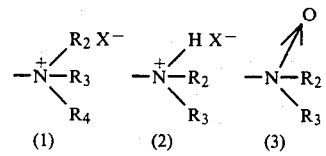

where $R_2$, $R_3$ and $R_4$ are short chain alkyl or cycloalkyl or aryl or hydroxyalkyl or where $R_2$ and $R_3$ form part of a ring system and where $R_2$, $R_3$ and $R_4$ may be the same or different, provided that the total number of carbon atoms in $R_2+R_3+R_4$ is less than 10 for the cationic species (I) or provided that the total number of carbons in $R_2+R_3$ is less than 8 for the amine salts (2) and amine oxides (3) and where $X^-$, the counterion, may be an inorganic species selected from chloride, sulphate or nitrate or a lower organic ($<C_8$) carboxylate species such as acetate or lactate, but may also be hydroxide with the cationic species (I). Z may also represent an alkoxylated chain of the type:

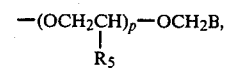

where p is 1 to 680, and

and where $R_5$ is a hydrogen or a short alkyl group and M is a metal, ammonium or substituted ammonium cation. Especially preferred is $R_5$=hydrogen, B=$CH_2OH$ and p<20.

In a further preferred form of the invention, A represents a linear saturated crosslinked carbon chain of the type:

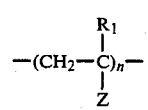

where $R_1$ is again hydrogen or methyl and Z is attached directly to the chain A. The group Z can be any of those described above but especially preferred is the metal, ammonium or substituted ammonium salt of a carboxylic acid, where the carboxylated monomers constitute at least 75% of the total monomer composition.

Alternatively, A can represent an unsaturated crosslinked carbon chain derived from a diene monomer, or a mixture of carbon chain systems.

The level of crosslinking agent can be from 1-20% or more, preferably 2-10%. At crosslinking levels less than 1%, the polymers are soft gels in their solvent swollen state and are unable to support their own solvent swollen weight. Moreover, at crosslinking levels of 2% or less, the polymers are prone to structural collapse during the drying process unless great care is exercised in the choice of drying conditions.

At crosslinking levels of 15-20% or greater, shrinkage of the polymer during drying and re-swelling during solvent absorption is eliminated because the polymer chains are immobilised by the crosslinking agent. However, the polymers will still have a water absorbency >3 g/g and saline/water absorption ratio <0.1, especially at the higher degrees of substitution (>40%, preferably >70%). Optimum polymer absorption occurs at crosslinking levels between 2-10% as a compromise between mechanical strength and polymer mobility and swelling.

Pore volume should be greater than 85% (5.6 cc/g) of polymer volume and preferably greater than 95% (20 cc/g) as the liquid absorption capacity increases with pore volume. Again liquid absorption capacity is dependent on the pore volume coupled with the levels of crosslinking and degree of substitution. At lower pore volumes, the crosslinking levels are preferably in the lower range (2-10%) and the level of substitution in the higher range (preferably >70%) for maximum liquid absorption.

The degree of substitution or functionalisation of the polymer is >30%, preferably >50% and most preferably >70%, since the amount of solvent imbibed increases with number of ionic or polar functional groups present, provided the level of crosslinking does not exceed 15-20%. Above this level of crosslinking, the amount of liquid absorbed becomes much less sensitive to the degree of substitution since the liquid uptake is then dependent on the mobility of the solvated polymer chains.

With high degrees of substitution (usually <50%) and lower levels of crosslinking (<15%), these ionic or polar polymers generally collapse on drying from polar solvents, such as methanol or water, into hard granules, which show a marked visible swelling when liquid absorption takes place from the dried state, although such a collapse and re-swelling is not an essential feature of the invention. These physically collapsed materials generally show little affinity for organic oils which is reflected in their low oleic acid absorption figures (see examples). When dried from a non-polar solvent, such as hexane, these polymers may retain a more open expanded, brittle structure and, in the case of the cationic nitrogen species and amine salts and amine oxides, may become much less hydrophilic in nature and show a greater ability to absorb lipophilic oils. In some instances, such as the ethoxylates or with the highly crosslinked polymers or with polymers having a lower degree of substitution, no physical collapse occurs on drying from polar solvents so that they retain a greater ability to wick in oleic acid. The ethoxylated polymers are soft, rubbery and elastic.

The absorbent materials provided by this invention are generally prepared indirectly by chemical modification of a preformed porous polymer block carrying a reactive group such as a chloromethyl or ester functionality. The preformed porous polymers which are suitable for subsequent chemical modification can be prepared by polymerisation of suitable monomers of low water solubility, such as chloromethylstyrene, n-butyl methacrylate, t-butyl acrylate, 2-ethylhexyl acrylate or other appropriate acrylate or methacrylate esters or their mixtures. Other co-monomers (including the crosslinking agent) can also be incorporated at levels up to 20% or more provided that such monomers do not destabilise the high internal phase emulsion used in the polymer preparation and provided that the reactive monomer is present at a sufficiently high level to enable the final polymer generated after chemical modification to carry ionic or polar function groups on a minimum of 30% of the monomer residues.

Other suitable monomers which can be used to prepare the highly porous polymer for subsequent chemical modification are styrene, α-methylstyrene or other substituted styrenes or vinylaromatic monomers which, after polymerisation, can be chloromethylated, nitrated or otherwise functionalised to produce a porous polymer intermediate which can be subsequently converted to the ionic or polar porous polymers of this invention.

Alternatively, the porous polymers carrying the ionic or polar functional groups can be prepared directly by emulsification and polymerisation of the appropriate monomer provided that such a monomer can be formed into a stable and polymerisable high internal phase emulsion.

This invention also provides a porous, homogeneous, crosslinked polymeric material having a dry density of less than 0.15 g/cc and comprising at least 30% by weight of chloromethyl styrene residues crosslinked with a di-functional agent such as divinyl benzene.

The chloromethyl styrene polymer is prepared by the general procedure described in European Patent Application No. 60 138.

The method of preparation of the crosslinked chloromethyl styrene polymer is similar to that of styrene-based porous polymer, although a slightly higher concentration of emulsifier is required to give a uniform structure (25% for chloromethyl styrene cf 20% for styrene).

Lower levels of emulsifier give materials which contain some large voids (ca 100 μm) in addition to the typical pore structure (ca 10 μm). With higher levels of surfactant the preparation of the emulsion becomes more difficult and 25% emulsifier is the maximum level which can be incorporated into a 96.5% internal phase emulsion with ease.

2.5 gm Span 80 and 1 cm³ commercial divinyl benzene/ethyl vinyl benzene are dissolved in 10 cm³ chloromethyl styrene in a polypropylene beaker. 0.75 gm potassium persulphate is dissolved in 300 cm³ demineralised water and this solution is added dropwise to the stirred monomer/surfactant mixture. After the addition of the potassium persulphate solution is complete the beaker is sealed and heated to 60° C. in a water bath to effect polymerisation. After 18 hours a solid block of wet polymer is obtained which may be dried in air at 30° to 40° C.

In the examples, the starting substrate was a porous polymer prepared by the process as described. The polymer was dried and soxhlet extracted with hexane prior to any chemical transformations, to remove the residual emulsifier (Span 80), but this is not essential in most of the chemical modification reactions. Extraction of the emulsifier was carried out partly to reduce the possibility of unwanted side reactions and partly to facilitate interpretation of Infra Red Spectra which were used qualitatively to monitor extents of reaction.

The polyacrylate materials were prepared by hydrolysis of the corresponding acrylate esters. These acrylate ester polymers were prepared in a similar manner to that used for chloromethylstyrene with SPAN 80 as emulsifier.

Quantitative Organic Analysis' LONGMAN'S 3rd ED 1961 p 267 Sub III 35 Proc. B).

| Example | Preparation of Examples Shown in Table 1 |
|---|---|
| | Preparation |
| 1 | Excess aqueous amine, reflux, 30 min with chloromethyl polymer |
| 2 | Excess ethanolic amine, reflux, 25.0 hours with chloromethyl polymer |
| 3 | Excess ethanolic amine, reflux, 7.5 hours with chloromethyl polymer |
| 4 | Excess ethanolic amine, reflux, 7.0 hours with chloromethyl polymer |
| 5 | Standard porous polymer preparation |
| Polystyrene polymer | |
| 6 | Excess aqueous amine, 45°, 3.0 min with chloromethyl polymer |
| 7 | Excess aqueous amine, 50°, 3.0 min with chloromethyl polymer |
| 8 | Excess aqueous amine, reflux, 7.0 hours with chloromethyl polymer |
| 9 | $OH^-/Cl^-$ exchange on Example 8 |
| 10 | $NO_3^-/Cl^-$ exchange on Example 1 |
| 11–13 | Excess aqueous amine, 65°, 2.0 hours with chloromethyl polymer |
| 14 | Excess aqueous amine, reflux, 7.0 hours with chloromethyl polymer |

The invention will now be described in greater detail and data concerning the new polymers claimed and comparable polymers not within the scope of this invention are given in the Tables. Temperatures are °C.

Preparation of Cationic Nitrogen Derivatives

Depending on the solubility of the tertiary amine to be employed, water or ethanol was chosen as solvent for the reaction, although other solvents could be employed. The preformed chloromethyl styrene porous polymer was filled with solvent under vacuum in a round bottomed flask and the desired tertiary amine added (usually 10 times molar excess, although greater or lesser amounts of amine can be used). The reactants were heated at temperatures between 40° C. and reflux for periods between 3 minutes and 15 hours depending on (a) the reactivity of the amine and (b) the desired extent of reaction. Reaction will take place at lower temperatures but the reaction times are increased. The cationic product was removed from the reaction mixture, washed extensively with water or ethanol and then methanol to remove unreacted tertiary amine. The solids were then allowed to air dry from the methanol saturated state. Alternatively, the methanol saturated polymer could be treated with ethyl acetate and then hexane to give a hexane swollen polymer which was allowed to air dry. These solids could, if desired, be further dried in a vacuum oven at elevated temperatures (80° C.). The solids obtained from methanol were generally collapsed, hard particles, whereas those obtained from hexane were generally expanded, less dense polymer pieces. The dried solids were then examined for their liquid absorption properties. The extents of reaction were quantified using a standard Volhard's estimation for chloride ions (see A I Vogel 'A textbook of Examples are given in Table I. Here Examples 1 to 4 show that increasing the N-alkyl chain length decreases the aqueous absorption such that the products are unsatisfactory where the total number of carbons in the N-alkyl groups exceeds 10. Example 5 shows that the material disclosed in European Patent Application No. 60 138 also fails our criteria. Examples 6–8 and 1 shows the effect of increasing the degree of functionalisation of the polymer where the lowest substituted material is excluded from our invention. Examples 8–10 and 1 show the effect of the counterion on the liquid absorption. Examples 11 and 1 show the effect of pore volume and Examples 12, 13 and 1 show the effect of crosslinking level. Table 1B shows the effect of drying the polymers from a non-polar solvent, ie that the hydrophilicity is reduced and the lipophilicity is increased relative to the methanol dried samples.

Salts of the Amino Derivatives

The amine salts are prepared by treating the appropriate amines with either neat or dilute solutions of the desired mineral or organic acids. Thus, for example, the amines can be treated with methanolic solutions of hydrochloric acid, aqueous solutions of sulphuric acid or neat lactic or oleic acids. The salts so formed are then washed with solvent until free of excess acid and dried.

| Example | Preparation of Examples Shown in Table 2 | |
|---|---|---|
| | Amine Preparation | Salt Preparation |
| 1 | Excess aqueous amine on chloromethyl, reflux, 15 hours | Methanolic HCl on amine |
| 2 | Excess aqueous amine on chloromethyl, 70°, 21 hours | Methanolic HCl on amine |
| 3 | Excess ethanolic amine on chloromethyl, 100°, 11 hours | Methanolic HCl on amine |
| 4 | Standard porous polymer preparation | |
| Polystyrene polymer | | |
| 5 | Excess aqueous amine on chloromethyl, 90°, 5 min | Methanolic HCl on amine |
| 6 | Excess aqueous amine on chloromethyl, 90°, 5 min | 50% $H_2SO_4/H_2O$ on amine |
| 7 | Excess aqueous amine on chloromethyl, reflux, 15 hours | 50% $H_2SO_4/H_2O$ on amine |
| 8 | Excess aqueous amine on chloromethyl, reflux, 15 hours | 100% lactic acid on amine |
| 9 | Excess aqueous amine on chloromethyl, reflux, 15 hours | 100% oleic acid on amine |
| 10,11,13 | Excess aqueous amine on chloromethyl, reflux, 25 hours | Methanolic HCl on amine |

Examples are given in Table 2. Examples 1–3 show the effect of increasing the number of carbons attached to nitrogen such that the invention fails with more than 8 carbons. Example 4 again shows the failure of the materials disclosed in European Patent Application No. 60 138. Examples 5–9 and 1 show the effect of the counterion and the effect of increasing level of substitution. Note that Example 9 with the long chain organic counterion fails our criteria. Examples 10 and 1 show the effect of pore volume. Examples 11–13 show the effect of increasing the degree of crosslinking. Table 2B again shows the effect of drying solvent.

Preparation of the Amine Oxide Derivatives

The amine oxide derivatives were prepared by immersing the amino porous polymer in 30% hydrogen peroxide solution, using vacuum filling to assist the process. The reactants were then heated at 60° C. for periods up to 15 hours. The solids were recovered, washed and dried as before.

As with the short alkyl chain cationics and amine salts, the amine oxide derivatives with short chains dried from methanol as collapsed, dense, brittle particles that were hydrophilic and water-swellable. Again, these dried polymers show an equally high affinity for saline solutions as they do for water but have little desire to absorb oleic acid.

| Preparation of Examples Shown in Table 3 | |
|---|---|
| Example | Preparation |
| 1 | Excess 30% aqueous $H_2O_2$, 60°, 14 hours on amine |
| 2 | Excess 30% aqueous $H_2O_2$, 60°, 6 hours on amine |
| 3 | Excess 30% aqueous $H_2O_2$, 60°, 7 hours on amine |
| 4 Polystyrene polymer | Standard porous polymer preparation |
| 5 | Excess 30% aqueous $H_2O_2$, 60°, 6 hours on amine |
| 6–8 | Excess 30% aqueous $H_2O_2$, 60°, 10 hours on amine |

Examples are given in Table 3. Examples 1–3 show the effect of increasing carbon number attached to nitrogen so that the invention fails with more than 8 carbons. Examples 5 and 1 show the effect of substitution level and Examples 6 and 2 show the effect of pore volume. Examples 7, 8 and 2 show the effect of crosslinking level. Table 3B shows the effect of drying solvent.

Preparation of Aliphatic Sulphate Derivatives

Porous polymers containing aliphatic sulphate groups can be obtained by treatment of the chloromethyl styrene polymer with the sodium or potassium salt of acetic acid in dimethyl formamide (DMF) as solvent, at reflux for periods up to 15 hours, to yield the acetoxy derivative. After washing out the DMF, the acetate ester can be hydrolysed in aqueous ethanol at reflux for period up to 15 hours.

The hydroxymethylstyrene polymer so produced can, in principle, be sulphated by a number of standard techniques but is preferably sulphated under conditions of low acidity such as with sulphur trioxide:amine complexes. For example, heating the hydroxymethyl polymer on a steambath for up to 35 hours with an excess of $SO_3$:pyridine complex in DMF as solvent, gives the desired sulphate salt after workup and neutralisation. Two examples of sulphate derivatives with different degrees of substitution are given in Table 4 (Examples 1 and 2).

Preparation of Aliphatic Sulphonate Derivatives

A porous polymer containing aliphatic sulphonate groups was obtained by prolonged treatment of the hydrophilic, water-swellable triethyl ammonium substituted polymer with a solution of sodium sulphite in water at pH9. The reactants were refluxed for up to 70 hours. The polymeric solids were recovered, washed with water, then methanol and dried to give collapsed, brittle polymer particles that wer hydrophilic and water swellable. Infra red spectroscopy confirmed that the cationic group was no longer present and that sulphonate functional groups were now present.

Liquid absorption properties are given in Table 4, where Examples 3 to 5 show the effect of substitution level on liquid uptake. Examples 4 and 5 (Table 4(A) and (B)) show that the drying solvent has relatively little effect on the liquid absorption.

Preparation of Carboxylated Porous Polymers

These can be obtained by a variety of synthetic routes such as two step oxidation of the chloromethyl derivative. Thus, the chloromethylstyrene polymer can be oxidised with dimethyl sulphoxide and potassium bicarbonate at 155° C. for periods up to 21 hours to the aldehyde containing polymer, which in turn can be oxidised further to the carboxylic acid with a variety of standard oxidising agents. Alternatively, the chloromethyl styrene polymer or the corresponding alcohol can be oxidised directly to the carboxylic acid using a mixture of nitric acid and potassium nitrate at 100° C. for period up to 7 hours. Alternatively, carboxylic acid containing polymers can be obtained by reaction of the chloromethyl styrene polymer with the anion derived from diethylmalonate, followed by hydrolysis of the ester groupings. These solids in their acidic form are hydrophobic and float on water at neutral or acidic pH, whereas when placed in water at alkaline pH, they will become hydrophilic and absorb the aqueous liquid. In the form of their sodium salts, the polymers are hydrophilic at neutral pH and will absorb water and sink.

Preferably, the hydroxymethyl polymer is oxidised to the carboxylate with standard oxidising agents such as nitric acid or alkaline permanganate, by warming the mixture on a steam bath for up to 1 hour with permanganate or for up to 6 hours with nitric acid. Under these conditions, some polymer cleavage can occur and can result in a polymer carrying a higher than expected number of carboxylate functions. This polymer cleavage results in some loss of mechanical strength due to the increased mobility of some polymer segments and, as such, behaves as a polymer of lower crosslinked density. With nitric acid oxidation of hydroxymethyl and chloromethyl polymers, nitration of the aromatic ring generally co-occurs along with oxidation to the carboxylate but this does not detract from the absorption properties of the polymer.

The acrylic and methacrylic carboxylated polymers are prepared from the corresponding esters by hydrolysis. This can be achieved in aqueous sulphuric acid of between 50 and 90% concentration depending on how resistant the esters are to hydrolysis. At lower temperatures, such as room temperature, the hydrolysis may require several days but can be carried out over several hours at higher temperatures eg 60° C.

Examples are given in Table 4. Examples 6–9 show the effect of increasing the degree of carboxylation. Here Examples 8 and 9 are quoted as having 5% crosslinks from the divinyl benzene used in the polymer preparation but, in reality, the effective crosslinking level is probably less due to chain cleavage during oxidation. Example 10 shows the effect of reducing pore volume. Again, Examples 11–13 show the effect of increasing the degree of substitution. Examples 14–16 are polymers that do not fulfil our criteria. Table 4(B) shows that the drying solvent has some effect on the absorption characteristics of the carboxylated polymers but that this is not as marked as with the nitrogen containing polymers. Table 4C shows that the carboxylic acid form of the polymers do not satisfy our criteria of invention but are disclosed since they give rise to the ionic form which falls within our definition.

Preparation of Examples Shown in Table 4

| Example | Preparation |
| --- | --- |
| 1 | Excess SO3—pyridine complex in DMF*, 100°, 35 hours on appropriate alcohol |
| 2 | Chlorosulphonic acid in ether, RT, 1-2 hours on appropriate alcohol |
| 3,4,5 | Excess aqueous Na2SO3, reflux, 55 hours on appropriate cationic polymer |
| 6 | Excess m-chloroperbenzoic acid in trichloroethane, 60°, 15 hours on appropriate aldehyde |
| 7,8,10 | Excess concentrated HNO3, 100°, 5-6 hours on appropriate alcohol |
| 9 | Excess alkaline KMnO4, 100°, 1 hour on appropriate alcohol |
| 11 | Hydrolysis of 2-ethylhexyl acrylate in 90% H2SO4, RT, 2 weeks |
| 12 | Hydrolysis of n-butyl methacrylate in concentrated H2SO4, RT, 5.5 days |
| 13 | Hydrolysis of t-butyl acrylate in 90% H2SO4, RT, 3 days |
| 14-16 | Standard porous polymer preparations |
| 17 | Acidic form of Example 9 |
| 18 | Acidic form of Example 8 |
| 19 | Similar to acidic form of Example 6 |

*DMF = dimethyl formamide

Preparation of Ethoxylated Derivatives

In the preparation currently employed, standard chloromethyl styrene polymer is treated with the anionic form of a polyethylene glycol in excess polyethylene glycol as solvent. In some instances, the glycol itself is too viscous at room temperature to enter the pores of the polymer, even under vacuum, in which case the glycol is heated to reduce its viscosity to a point where the polymer can be vacuum filled. The reactants are then heated at 90°-100° C. for periods up to 30 hours. The solids are recovered, washed with water until glycol and alkali free, then washed with methanol and dried. Alternatively, the methanol saturated polymer can be solvent exchanged for hexane and then dried. In either case, an open expanded, rubbery, elastic solid is recovered which can be used for liquid absorption.

Other processes which can be employed include those in which the polymer is treated with the glycol anion in a suitable inert solvent, especially where the glycol has such a high molecular weight that it is too viscous/solid to enter the polymer pores even under heating/vacuum. Other standard ethoxylation processes, such as the use of ethylene oxide for the ethoxylation of hydroxy or carboxy functionalised polymers, can also be used.

Ion Exchange Properties

The ionic polymers of this invention can also be used as efficient ion exchange resins by virtue of their high porosity and will function in this capacity at a much greater rate than currently marketed ion exchange beads. This can be readily visualised by the rapid decolourisation of dilute solutions of ionic dyes. For example, a dilute solution of sodium fluorescein was prepared. To 10 ml of this solution was added 50 mg of a dried cationic polymer of this invention (Table 1, Example 1) and the polymer allowed to swell in the aqueous liquor. To further 10 ml samples of this dye solution was added (a) 100 mg (about the same exchange capacity as above) and (b) 500 mg (about 5 times the exchange capacity as the above) of wet commercial resin beads (Amberlite IRA 400, containing about 50% water).

The mixtures were shaken for 30 seconds after which it could be seen that the liquors containing the commercial ion exchange beads were still intensely coloured whereas the liquor containing our porous polymer was virtually colourless and that the polymer was now coloured orange by the absorbed dye.

Similarly a solution containing 100 ppm $Fe^{3+}$ ions, present as the intensely red coloured thiocyanate complex was prepared. To 10 ml of this solution was added 10 mg of a dried carboxylated polymer (sodium form) of

Preparation of Examples Shown in Table 5

| Example | Preparation |
| --- | --- |
| 1 | PEG 400 anion in PEG 400 as solvent, 100°, 30 hours on chloromethyl polymer |
| 2 | PEG 200 anion in PEG 200 as solvent, 100°, 25 hours on chloromethyl polymer |
| 3 | Diethylene glycol anion in diethylene glycol as solvent, 100°, 25 hours |
| 4-6 | PEG 200 anion in PEG 200 as solvent, 100°, 25 hours on chloromethyl polymer |
| 7 Polystyrene polymer | Standard porous polymer preparation |

*PEG — polyethylene glycol

Examples are given in Table 5. Examples 1-3 show the effect of decreasing EO chain length. Examples 2 and 4 show the effect of void volume. Examples 5, 6 and 2 show the effect of crosslinking level. Example 7 again shows that the materials disclosed in European Patent Application No 60 138 fall outside this invention.

this invention (Table 4, Example 7) and the polymer allowed to swell in the aqueous phase. To further 10 ml samples of the ferric solution was added (a) 30 mg (about the same exchange capacity as above) and (b) 300 mg (about 10 times the exchange capacity as above) of commercially available exchange resin (Zeo Karb 225, $Na^+$ form containing $H_2O$). The mixtures were allowed to stand at RT over several hours with intermittent shaking. The sample containing 30 mg of commercial resin showed little change in colour over 4 hours whereas the sample containing 300 mg of commercial resin showed a loss of colour over 2 hours while still being distinctly coloured. By contrast, the mixture containing our porous polymer showed a significant loss of colour after several minutes and was virtually colourless in one hour.

A 50 ml burette was packed with 0.28 g of preswollen porous polymer (Table 1, Example 1) and through this was passed a solution of 0.1% dodecylbenzene sulphonate at a flow rate of 2 ml per minute. The aqueous liquor passing out of the column was monitored using UV spectroscopy. Initially, the aqueous liquor contains less than 0.005% detergent by comparison with the UV spectrum of control solutions and only after about 290 ml of liquor had passed through the column did the concentration of detergent start to increase. Using the same burette, about 7 g of commercial resin beads (Amberlite IRA 400) were required in the column to reduce the detergent level to less than 0.005% at the same rate of flow.

TABLE 1

Cationic polymers of the type:

$$-(CH_2CH)_n-$$ with phenyl ring bearing $CH_2\overset{+}{N}R_1R_2R_3$ $X^-$

| Example | Polymer | Cross-linking Level (%) | Pore Volume (cc/g) | Level of Substitution (%) | H$_2$O | 10% NaCl | Oleic Acid | 10% NaCl H$_2$O Ratio |
|---|---|---|---|---|---|---|---|---|
| (A) All polymers dried from methanol | | | | | | | | |
| 1 | R$_1$ = R$_2$ = R$_3$ = CH$_3$ x = Cl | 5 | 30 | 85 | 49.0 | 50.5 | <1 | 1.03 |
| 2 | R$_1$ = R$_2$ = R$_3$ = C$_2$H$_5$ x = Cl | 5 | 30 | 85 | 53.5 | 40.9 | <1 | 0.76 |
| 3 | R$_1$ = R$_2$ = CH$_3$ R$_3$ = C$_6$H$_{13}$ x = Cl | 5 | 30 | 80 | 27.2 | 22.9 | 1.05 | 0.84 |
| 4 | R$_1$ = R$_2$ = CH$_3$ R$_3$ = C$_{10}$H$_{21}$ x = Cl | 5 | 30 | 70 | 0* | 0* | — | — |
| 5 | unsubstituted polystyrene | 5 | 30 | 0 | 0* | 0* | 26.0 | — |
| 6 | R$_1$ = R$_2$ = R$_3$ = CH$_3$ x = Cl | 5 | 30 | 27 | 1.5 | 1.06 | 2.7 | 0.70 |
| 7 | R$_1$ = R$_2$ = R$_3$ = CH$_3$ x = Cl | 5 | 30 | 58 | 20.5 | 5.5 | <1 | 0.27 |
| 8 | R$_1$ = R$_2$ = R$_3$ = CH$_3$ x = Cl | 5 | 30 | 71.5 | 38.0 | 47.1 | <1 | 1.24 |
| 1 | R$_1$ = R$_2$ = R$_3$ = CH$_3$ x = Cl | 5 | 30 | 85 | 49.0 | 50.5 | <1 | 1.03 |
| 9 | R$_1$ = R$_2$ = R$_3$ = CH$_3$ x = OH | 5 | 30 | 71.5 | 51.5 | 46.1 | <1 | 0.89 |
| 8 | R$_1$ = R$_2$ = R$_3$ = CH$_3$ x = Cl | 5 | 30 | 71.5 | 38.0 | 47.1 | <1 | 1.24 |
| 1 | R$_1$ = R$_2$ = R$_3$ = CH$_3$ x = Cl | 5 | 30 | 85 | 49.0 | 50.5 | <1 | 1.03 |
| 10 | R$_1$ = R$_2$ = R$_3$ = CH$_3$ x = NO$_3$ | 5 | 30 | 85 | 36.9 | 29.4 | <1 | 0.79 |
| 11 | R$_1$ = R$_2$ = R$_3$ = CH$_3$ x = Cl | 5 | 9 | 88.5 | 25.2 | 21.8 | 1.4 | 0.86 |
| 1 | R$_1$ = R$_2$ = R$_3$ = CH$_3$ x = Cl | 5 | 30 | 85 | 49.0 | 50.5 | <1 | 1.03 |
| 12 | R$_1$ = R$_2$ = R$_3$ = CH$_3$ x = Cl | 2 | 30 | 86.5 | 18.3 | 4.8 | <1 | 0.26 |
| 1 | R$_1$ = R$_2$ = R$_3$ = CH$_3$ x = Cl | 5 | 30 | 85 | 49.0 | 50.5 | <1 | 1.03 |
| 13 | R$_1$ = R$_2$ = R$_3$ = CH$_3$ x = Cl | 10 | 30 | 80.5 | 39.0 | 42.5 | 1.25 | 1.09 |
| (B) All polymers dried from hexane | | | | | | | | |
| 14 | R$_1$ = R$_2$ = R$_3$ = CH$_3$ x = Cl | 5 | 30 | 70 | 24.0 | 25.2 | 3.6 | 1.05 |
| 1 | R$_1$ = R$_2$ = R$_3$ = CH$_3$ x = Cl | 5 | 30 | 85 | 27.0 | 37.3 | 9.0 | 1.38 |
| 2 | R$_1$ = R$_2$ = R$_3$ = C$_2$H$_5$ x = Cl | 5 | 30 | 85 | 0* | 0* | 18.0 | — |
| 3 | R$_1$ = R$_2$ = CH$_3$ R$_3$ = C$_6$H$_{13}$ x = Cl | 5 | 30 | 80 | 0* | 0* | 4.3 | — |

*Floats on the liquid

TABLE 2

Amine Salts of the type:

$$-(CH_2CH)_n-$$ with phenyl ring bearing $CH_2\overset{+}{N}(H)R_1R_2$ $X^-$

| Example | Polymer | Cross-linking Level (%) | Pore Volume (cc/g) | Level of Substitution (%)** | H$_2$O | 10% NaCl | Oleic Acid | 10% NaCl H$_2$O Ratio |
|---|---|---|---|---|---|---|---|---|
| (A) All polymers dried from methanol | | | | | | | | |
| 1 | R$_1$ = R$_2$ = CH$_3$ x = Cl | 5 | 30 | 85 | 35.5 | 27.2 | 1.1 | 0.76 |
| 2 | R$_1$ = R$_2$ = C$_2$H$_5$ x = Cl | 5 | 30 | 90 | 53.0 | 41.2 | <1 | 0.77 |
| 3 | R$_1$ = R$_2$ = C$_4$H$_9$ x = Cl | 5 | 30 | 74 | 0* | 0* | 5.8 | — |
| 4 | unsubstituted polystyrene | 5 | 30 | 0 | 0* | 0* | 26.0 | — |
| 5 | R$_1$ = R$_2$ = CH$_3$ x = Cl | 5 | 30 | 39 | 20.5 | 4.95 | 5.4 | 0.24 |

TABLE 2-continued

Amine Salts of the type:

$$-(CH_2CH)_n-\underset{\underset{H}{\overset{+}{CH_2N}}}{\bigcirc}\underset{R_2}{\overset{R_1}{\diagdown}}X^-$$

| Example | Polymer | Cross-linking Level (%) | Pore Volume (cc/g) | Level of Substitution (%)** | Liquid Absorption (g liquid/g polymer) | | | 10% NaCl H₂O Ratio |
|---|---|---|---|---|---|---|---|---|
| | | | | | $H_2O$ | 10% NaCl | Oleic Acid | |
| 6 | $R_1 = R_2 = CH_3$ x = $SO_4$ | 5 | 30 | 39 | 11.2 | 8.6 | 4.9 | 0.77 |
| 1 | $R_1 = R_2 = CH_3$ x = Cl | 5 | 30 | 85 | 35.5 | 27.2 | 1.1 | 0.76 |
| 7 | $R_1 = R_2 = CH_3$ x = $SO_4$ | 5 | 30 | 85 | 19.5 | 26.5 | <1.0 | 1.36 |
| 8 | $R_1 = R_2 = C_2H_5$ x = lactate | 5 | 30 | 85 | 16.1 | 9.6 | 16.3 | 0.59 |
| 10 | $R_1 = R_2 = CH_3$ x = Cl | 5 | 9 | 83.5 | 26.2 | 15.4 | 1.8 | 0.59 |
| 1 | $R_1 = R_2 = CH_3$ x = Cl | 5 | 30 | 85 | 35.5 | 27.2 | 1.1 | 0.76 |
| 11 | $R_1 = R_2 = C_2H_5$ x = Cl | 2 | 30 | 78.5 | structural collapse on drying | | | |
| 11' | $R_1 = R_2 = C_2H_5$ x = Cl | 2 | 30 | 78.5 | 6.4 | 4.8 | <1 | 0.75 |
| 2 | $R_1 = R_2 = C_2H_5$ x = Cl | 5 | 30 | 90 | 53.0 | 41.2 | <1 | 0.77 |
| 13 | $R_1 = R_2 = C_2H_5$ x = Cl | 10 | 30 | 73 | 30.8 | 41.2 | 2.7 | 0.75 |
| (B) All polymers dried from hexane | | | | | | | | |
| 1 | $R_1 = R_2 = CH_3$ x = Cl | 5 | 30 | 85 | 40.0 | 25.0 | 12.2 | 0.62 |
| 2 | $R_1 = R_2 = C_2H_5$ x = Cl | 5 | 30 | 90 | 58.5 | 23.6 | 13.8 | 0.40 |
| 3 | $R_1 = R_2 = C_4H_5$ x = Cl | 5 | 30 | 74 | 0* | 0* | 11.2 | — |
| 9 | $R_1 = R_2 = C_2H_5$ x = oleate | 5 | 30 | 85 | 0* | 0* | 60.0 | — |

*Floats on the liquid
**Level of substitution in parent amine
11 and 11' are identical materials dried under different conditions

TABLE 3

Amine oxides of the type:

$$-(CH_2CH)_n-\underset{CH_2-N}{\bigcirc}\underset{\overset{\downarrow}{O}}{\diagup}\underset{R_2}{\overset{R_1}{\diagdown}}$$

| Example | Polymer | Crosslinking Level (%) | Pore Volume (cc/g) | Level of Substitution (%)** | Liquid Absorption (g liquid/g polymer) | | | 10% NaCl H₂O Ratio |
|---|---|---|---|---|---|---|---|---|
| | | | | | $H_2O$ | 10% NaCl | Oleic Acid | |
| (A) All polymers dried from methanol | | | | | | | | |
| 1 | $R_1 = R_2 = CH_3$ | 5 | 30 | 85 | 52.5 | 36.7 | <1 | 0.70 |
| 2 | $R_1 = R_2 = C_2H_5$ | 5 | 30 | 85 | 51.2 | 56.7 | <1 | 1.11 |
| 3 | $R_1 = R_2 = C_4H_9$ | 5 | 30 | 74 | 0* | 0* | 25.5 | — |
| 4 | unsubstituted polystyrene | 5 | 30 | 0 | 0* | 0* | 26.0 | — |
| 5 | $R_1 = R_2 = CH_3$ | 5 | 30 | 39 | 22.0 | 18.6 | 12.8 | 0.84 |
| 1 | $R_1 = R_2 = CH_3$ | 5 | 30 | 85 | 52.5 | 36.7 | <1 | 0.70 |
| 6 | $R_1 = R_2 = C_2H_5$ | 5 | 9 | 83.5 | 24.1 | 9.8 | <1 | 0.41 |
| 2 | $R_1 = R_2 = C_2H_5$ | 5 | 30 | 85 | 51.2 | 56.7 | <1 | 1.11 |
| 7 | $R_1 = R_2 = C_2H_5$ | 2 | 30 | 78.5 | structural collapse on drying | | | |
| 7' | $R_1 = R_2 = C_2H_5$ | 2 | 30 | 78.5 | 19.8 | 5.4 | <1 | 0.27 |
| 2 | $R_1 = R_2 = C_2H_5$ | 5 | 30 | 85 | 51.2 | 56.7 | <1 | 1.11 |
| 8 | $R_1 = R_2 = C_2H_5$ | 10 | 30 | 73 | 13.0 | 27.0 | 14.9 | 2.0 |
| (B) All polymers dried from hexane | | | | | | | | |
| 1 | $R_1 = R_2 = CH_3$ | 5 | 30 | 85 | 24.2 | 35.4 | 14.2 | 1.46 |
| 2 | $R_1 = R_2 = C_2H_5$ | 5 | 30 | 85 | 36.2 | 46.3 | 71.5 | 1.28 |
| 3 | $R_1 = R_2 = C_4H_9$ | 5 | 30 | 74 | 0* | 0* | 16.2 | — |

*floats on the liquid
**level of substitution in parent amine
7 and 7' are identical materials dried under different conditions

TABLE 4

Polymers of the type:

$$-(CH_2CH)_n-$$
with phenyl ring bearing P and Z substituents (I), or $-(CH_2-CR_5)_n-$ with Z substituent (II)

(I)      (II)

| Example | Polymer | Crosslinking Level (%) | Pore Volume (cc/g) | Level of Substitution (%) | H$_2$O | 10% NaCl | Oleic Acid | 10% NaCl H$_2$O Ratio |
|---|---|---|---|---|---|---|---|---|
| (A) All polymers dried from methanol | | | | | | | | |
| 1 | I, P = H, Z = CH$_2$OSO$_3$Na | 5 | 30 | 70 | 29.1 | 25.5 | 5.2 | 0.87 |
| 2 | I, P = H, Z = CH$_2$OSO$_3$Na | 5 | 30 | 50 | 15.0 | 11.2 | 9.0 | 0.75 |
| 3 | I, P = H, Z = CH$_2$SO$_3$Na | 5 | 30 | 85 | 49 | 50 | <1 | 1.02 |
| 4 | I, P = H, Z = CH$_2$SO$_3$Na | 5 | 30 | 58 | 26.4 | 21.2 | <1 | 0.80 |
| 5 | I, P = H, Z = CH$_2$SO$_3$Na | 5 | 30 | 30 | 3.5 | 6.2 | 2.6 | 1.77 |
| 6 | I, P = H, Z = COONa | 5 | 30 | 50 | 14.8 | 22.8 | 9.0 | 1.54 |
| 7 | I, P = NO$_2$, Z = COONa | 5 | 30 | 86.5 | 49.9 | 6.2 | <1 | 0.12 |
| 8 | I, P = NO$_2$, Z = COONa | 5 | 30 | 95 | 69.8 | 14.9 | <1 | 0.24 |
| 9 | I, P = H, Z = COONa | 5 | 30 | 100 | 80.3 | 51.8 | <1 | 0.64 |
| 10 | I, P = NO$_2$, Z = COONa | 5 | 9 | 70 | 29.8 | 3.0 | <1 | 0.10 |
| 11 | II, R$_5$ = H, Z = COONa (50/50 copolymer with styrene) | 5 | 30 | 30 | 15.0 | 11.6 | 5.3 | 0.77 |
| 12 | II, R$_5$ = CH$_3$, Z = COONa | 5 | 30 | 62 | 38.3 | 37.3 | 13.8 | 0.97 |
| 13 | II, R$_5$ = H, Z = COONa | 5 | 30 | 75 | 53.5 | 32.5 | <1 | 0.61 |
| 14 | II, R$_5$ = CH$_3$, Z = COOC$_4$H$_9$ | 5 | 30 | 90 | 0* | 0* | 2.3 | — |
| 15 | II, R$_5$ = H, Z = COOC$_4$H$_9$ | 5 | 30 | 90 | 0* | 0* | 8.2 | — |
| 16 | unsubstituted polystyrene | 5 | 30 | 0 | 0* | 0* | 26.0 | — |
| (B) All polymers dried from hexane | | | | | | | | |
| 5 | I, P = H, Z = CH$_2$SO$_3$Na | 5 | 30 | 30 | 2.4 | 5.0 | 1.8 | 2.08 |
| 4 | I, P = H, Z = CH$_2$SO$_3$Na | 5 | 30 | 58 | 20.2 | 31.5 | 1.85 | 1.56 |
| 13 | II, R$_5$ = H, Z = COONa | 5 | 30 | 75 | 45.3 | 42.4 | 5.5 | 0.94 |
| 11 | II, R$_5$ = H, Z = COONa (50/50 copolymer with styrene) | 5 | 30 | 30 | 17.3 | 16.0 | 10.3 | 0.92 |
| 15 | II, R$_5$ = H, Z = COOC$_4$H$_9$ | 5 | 30 | 90 | 0* | 0* | 8.2 | — |
| (C) Acid form of the carboxylated polymers, dried from hexane | | | | | | | | |
| 17 | I, P = H, Z = COOH | 5 | 30 | 100 | 0* | 0* | 1.2 | — |
| 18 | I, P = NO$_2$, Z = COOH | 5 | 30 | 95 | 0* | 0* | 4.7 | — |
| 19 | I, P = H, Z = COOH | 5 | 30 | 60 | 0* | 0* | 11.0 | — |

TABLE 5

Polymers of the type:

$$-(CH_2CH)_n-$$
with phenyl ring bearing $CH_2O(CH_2-CH_2O)_nH$ (A) All polymers dried from methanol

| Example | Polymer | Crosslinking Level (%) | Pore Volume (cc/g) | Level of Substitution (%) | H$_2$O | 10% NaCl | Oleic Acid | 10% NaCl H$_2$O Ratio |
|---|---|---|---|---|---|---|---|---|
| 1 | n = 8-9 | 5 | 30 | 90 | 18.0 | 15.4 | 12.6 | 0.85 |
| 2 | n = 4 | 5 | 30 | ** | 8.4 | 9.7 | 6.9 | 1.15 |
| 3 | n = 2 | 5 | 30 | ** | 7.0 | 7.4 | 7.4 | 1.06 |
| 4 | n = 4 | 5 | 9 | ** | 6.15 | 6.9 | 3.7 | 1.12 |
| 2 | n = 4 | 5 | 30 | ** | 8.4 | 9.7 | 6.9 | 1.15 |
| 5 | n = 4 | 2 | 30 | ** | 3.0 | 2.84 | 1.0 | 0.95 |
| 2 | n = 4 | 5 | 30 | ** | 8.4 | 9.7 | 6.9 | 1.15 |
| 6 | n = 4 | 10 | 30 | ** | 16.3 | 17.6 | 16.1 | 1.08 |
| 7 | unsubstituted polystyrene | 5 | 30 | 0 | 0* | 0* | 26.0 | — |

*floats on the liquid
**not determined

We claim:

1. A highly porous crosslinked, functionalised polymer, crosslinked from 1 to 20% and having interconnected cavities or chambers of micron dimensions whose total pore volume is greater than 85% (5.6 cc/g) in its solvent swollen state and having a capacity for spontaneous water absorption from its dry state of at least 3 g liquid per gram of polymer and having a capacity for saline absorption (10% NaCl) such that the ratio of saline to water absorption is greater than 0.1, said polymer comprising structural units

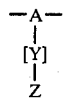

in which A represents a crosslinked carbon chain, Y is an optional spacer group and Z is an ionic or polar functional group, selected from lower alkyl cationic quaternary nitrogen groups of 10 carbon atoms or less, alkyl amine oxide groups of 8 carbon atoms or less, alkyloxy groups, a metal or ammonium or substituted ammonium salt of a sulphuric, carboxylic, phosphoric or sulphonic acid group or a mixture of such groups, except that where Z is a sulphonic acid Y does not represent

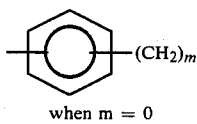

when m = 0

2. A polymer as claimed in claim 1 in which the ratio of saline to water absorption is greater than 0.5.

3. A polymer as claimed in claim 2 in which the ratio of saline to water absorption is greater than 0.7.

4. A polymer as claimed in claim 1, in which A represents a saturated, crosslinked carbon chain having the structure:

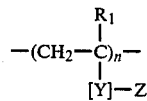

where $R_1$ is hydrogen or a methyl group and Y represents an aromatic or substituted aromatic ring.

5. A polymer as claimed in claim 1 in which Z represents a single or mixture of ionic or polar functional groups of structures 1-3

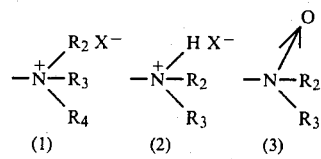

where $R_2$, $R_3$ and $R_4$ are alkyl or cycloalkyl or aryl or hydroxyalkyl or where $R_2$ and $R_3$ form part of a ring system and where $R_2$, $R_3$ and $R_4$ may be the same or different, provided that the total number of carbon atoms in $R_2+R_3+R_4$ is less than 10 for the cationic group (1) or provided that the total number of carbons in $R_2+R_3$ is less than 8 for the amine salts (2) and amine oxides (3) and where $X^-$, the counterion, may be an inorganic species selected from chloride, sulphate or nitrate or a lower organic ($<C_8$) carboxylate group, and where $X^-$ may be hydroxide in the cationic group (1).

6. A polymer as claimed in claim 1, in which Z represents an alkyloxy group the type:

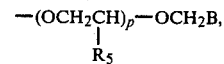

where p is 1 to 680, and

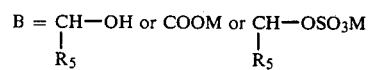

and where $R_5$ is a hydrogen or a short alkyl group and M is a metal, ammonium or substituted ammonium cation.

7. A polymer as claimed in claim 1, in which the level of crosslinking agent is from 2-10%.

8. A polymer as claimed in claim 1, in which the pore volume is greater than 95% (20 cc/g).

9. A polymer as claimed in claim 1, in which the degree of functionalisation of the polymer is greater than 50%.

10. A polymer as claimed in claim 1, in which the degree of functionalisation is greater than 50% and the level of crosslinking is less than 15%.

* * * * *